(12) United States Patent
Oshima

(10) Patent No.: US 8,415,435 B2
(45) Date of Patent: Apr. 9, 2013

(54) CONJUGATED DIENE-BASED POLYMER, METHOD FOR MANUFACTURING THE SAME, AND CONJUGATED DIENE POLYMER COMPOSITION

(75) Inventor: Mayumi Oshima, Bartlesville, OK (US)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/528,629

(22) PCT Filed: Feb. 27, 2008

(86) PCT No.: PCT/JP2008/053886
§ 371 (c)(1),
(2), (4) Date: Sep. 23, 2009

(87) PCT Pub. No.: WO2008/108377
PCT Pub. Date: Sep. 12, 2008

(65) Prior Publication Data
US 2010/0016499 A1    Jan. 21, 2010

(30) Foreign Application Priority Data

Feb. 28, 2007 (JP) ................................ 2007-048930

(51) Int. Cl.
*C08C 19/25* (2006.01)
*C08C 19/22* (2006.01)
*C08C 19/44* (2006.01)
*C08F 4/48* (2006.01)

(52) U.S. Cl. ........ 525/250; 525/254; 525/288; 525/293; 525/298; 525/315; 525/331.9; 525/342; 525/379; 525/384; 526/279; 526/335; 526/338; 526/340; 526/310; 524/571; 524/572

(58) Field of Classification Search .................. 524/571, 524/572; 525/250, 254, 288, 293, 298, 315, 525/331.9, 342, 379, 384; 526/279, 335, 526/338, 340, 310

See application file for complete search history.

(56) References Cited

U.S. PATENT DOCUMENTS 3,485,857 A * 12/1969 Speier ............................ 556/12
4,148,838 A    4/1979 Martin
5,128,416 A    7/1992 Imai et al.
5,189,109 A * 2/1993 Imai et al. ..................... 525/296
2005/0131181 A1  6/2005 Halasa et al.
2010/0179274 A1  7/2010 Jinbo et al.

FOREIGN PATENT DOCUMENTS

| EP | 0334042 A2 | 9/1989 |
| EP | 0341496 A2 | 11/1989 |
| EP | 0493364 A2 | 7/1992 |
| JP | 63-186748 A | 8/1988 |
| JP | 1-217047 A | 8/1989 |
| JP | 1-217048 A | 8/1989 |
| JP | 2005-290355 A | 10/2005 |

* cited by examiner

*Primary Examiner* — Roberto Rabago
(74) *Attorney, Agent, or Firm* — Sughrue Mion, PLLC

(57) ABSTRACT

An object of the present invention is to provide a conjugated diene-based polymer capable of providing a polymer composition which is excellent in a reduction in fuel consumption when silica is incorporated as a filler, a process for producing the conjugated diene-based polymer, and a polymer composition comprising said conjugated diene-based polymers and silica. The present invention provides a conjugated diene-based polymer comprising a conjugated diene-based constitutional unit and a constitutional unit expressed by the following formula (I), wherein said constitutional unit expressed by the formula (I) is between one of the conjugated diene-based constitutional units and another one: (I) (wherein X1, X2 and X3 represent independently a group expressed by the following formula (II), a hydroxide group, or a hydrocarbon group, and at least one of X1, X2 and X3 is the group expressed by the formula (II), or a hydroxide group: (II) wherein R1 and R2 represent independently a hydrocarbon group having 1 to 6 carbon atoms which can contain a nitrogen atom, an oxygen atom, or a silicon atom, and R1 and R2 can be combined to form a ring structure).

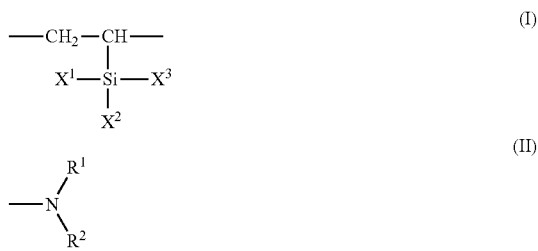

6 Claims, No Drawings

CONJUGATED DIENE-BASED POLYMER, METHOD FOR MANUFACTURING THE SAME, AND CONJUGATED DIENE POLYMER COMPOSITION

FIELD OF THE INVENTION

The present invention relates to a conjugated diene-based polymer, a process for producing the conjugated diene-based polymer and a conjugated diene-based polymer composition.

BACKGROUND OF THE INVENTION

Recently, there has been a need for a polymer composition used for automobile tires to be prominent in reducing fuel consumption because automobiles have been increasingly required to have less fuel consumption owing to an increasing interest in environmental problems. As polymer compositions for automobile tires, those which contain conjugated diene-based polymers such as polybutadienes and butadiene-styrene copolymers and fillers such as carbon black have been used. For example, as the conjugated diene-based polymers, there have been known polymer compositions containing polymers which are produced by copolymerizing butadienes and styrene with a polymerization initiator of alkyl lithium and then modifying the ends of the copolymer chains with an acrylamide having a dialkylamino group (see, for example, Patent document 1), similarly, polymer compositions containing polymers which are produced by copolymerizing butadienes and styrene with a polymerization initiator of alkyl lithium and then modifying the ends of the copolymer chains with a bis(dimethylamino) methylvinylsilane (see, for example, Patent document 2), polymer compositions containing polymers which are produced by polymerizing butadienes or copolymerizing butadienes and styrene with a polymerization initiator of alkyl lithium and then modifying the ends of the resulting polymer chains with an alkoxysilane having a dialkylamino group (see, for example, Patent documents 3 and 4). Those have been proposed as polymer compositions promising a significant reduction in fuel consumption.

Patent document 1: JP-A-1-217047
Patent document 2: JP-A-1-217048
Patent document 3: JP-A-63-186748
Patent document 4: JP-A-2005-290355

SUMMARY OF THE INVENTION

However, the prior polymer compositions containing the conjugated diene-based polymers as described above, especially when silica is used as fillers, are not necessarily satisfactory in reducing fuel consumption. Under such circumstances, it is an object of the present invention that when silica is incorporated as a filler, a conjugated diene-based polymer capable of providing a polymer composition which achieves a great reduction in fuel consumption, a process for producing the conjugated diene-based polymer, and a polymer composition comprising said conjugated diene-based polymer and a filter such as silica incorporated thereinto.

The first embodiment of the present invention is directed to a conjugated diene-based polymer comprising a conjugated diene-based constitutional unit and a constitutional unit expressed by the following formula (I), wherein said constitutional unit expressed by the formula (I) is between one of the conjugated diene-based constitutional units and another one:

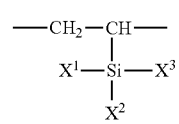

(I)

(wherein $X^1$, $X^2$ and $X^3$ represent independently a group expressed by the following formula (II), a hydroxide group, or a hydrocarbon group, and at least one of $X^1$, $X^2$ and $X^3$ is the group expressed by the formula (II), or a hydroxide group:

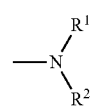

(II)

wherein $R^1$ and $R^2$ represent independently a hydrocarbon group having 1 to 6 carbon atoms which can contain a nitrogen atom, an oxygen atom, or a silicon atom, and $R^1$ and $R^2$ can be combined to form a ring structure).

The second embodiment of the present invention is directed to a process for producing a conjugated diene-based polymer comprising the following steps (A), (B) and (C):

step (A): polymerizing a monomer containing a conjugated diene with an alkali metal catalyst in a hydrocarbon solvent to provide a conjugated diene-based polymer having an alkali metal derived from said catalyst at the end of a polymer chain;

step (B): adding a silicon compound expressed by the following formula (III) to a solution of said conjugated diene-based polymer having an alkali metal derived from said catalyst at the end of the polymer chain in a hydrocarbon solvent, so as to react said silicon compound at the end of the polymer chain to produce a conjugated diene-based polymer having a structure, in which the alkali metal derived from said alkali metal catalyst bonds to a constitutional unit based on the silicon compound expressed by the formula (III), at the end of the polymer chain;

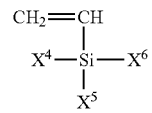

(III)

(wherein $X^4$, $X^5$ and $X^6$ represent independently a group expressed by the following formula (II) or a hydrocarbon group, and at least one of $X^4$, $X^5$ and $X^6$ is the group expressed by the formula (II) or a hydroxide group:

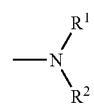

(II)

wherein $R^1$ and $R^2$ represent independently a hydrocarbon group having 1 to 6 carbon atoms which can contain a nitrogen atom, an oxygen atom, or a silicon atom, and $R^1$ and $R^2$ can be combined to form a ring structure);

step (C): adding a monomer containing a conjugated diene to a solution of said conjugated diene-based polymer having a structure, in which the alkali metal derived from said alkali metal catalyst bonds to said constitutional unit based on the above formula (I), at the end of the polymer chain in a hydrocarbon solvent, so as to polymerize said monomer at the end of said polymer chain.

The third embodiment of the present invention is directed to a conjugated diene-based polymer composition comprising the above conjugated diene-based polymer and a filler incorporated thereinto.

ADVANTAGES OF THE INVENTION

According to the present invention, when silica is incorporated as a filler, a conjugated diene-based polymer capable of providing a polymer composition which achieves a great reduction in fuel consumption, a process for producing the conjugated diene-based polymer, and a polymer composition comprising said conjugated diene-based polymer and a filter such as silica incorporated thereinto are provided. The polymer composition is excellent in a reduction in fuel consumption and is good in grip properties.

DETAILED DESCRIPTION OF THE INVENTION

The conjugated diene-based polymer of the present invention comprises a conjugated diene-based constitutional unit and a constitutional unit expressed by the following formula (I), wherein said constitutional unit expressed by the formula (I) is between one of the conjugated diene-based constitutional units and another one:

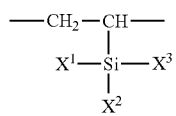
(I)

(wherein $X^1$, $X^2$ and $X^3$ represent independently a group expressed by the following formula (II), a hydroxide group, or a hydrocarbon group, and at least one of $X^1$, $X^2$ and $X^3$ is the group expressed by the formula (II), or a hydroxide group:

(II)

wherein $R^1$ and $R^2$ represent independently a hydrocarbon group having 1 to 6 carbon atoms which can contain a nitrogen atom, an oxygen atom, or a silicon atom, and $R^1$ and $R^2$ can be combined to form a ring structure).

The conjugated diene of the conjugated diene-based constitutional unit may include 1,3-butadiene, isoprene, 1,3-pentadiene, 2,3-dimethyl-1,3-butadiene, 1,3-hexadiene, and the like. These may be used alone or in a combination of two or more. 1,3-butadiene and isoprene are preferred in view of easy availability.

The $X^1$, $X^2$ and $X^3$ of the constitutional unit expressed by the formula (I) represent independently a group expressed by the following formula (II), a hydroxide group, or a hydrocarbon group which can contain substituents, and at least one of $X^1$, $X^2$ and $X^3$ is the group expressed by the formula (II), or a hydroxide group:

(II)

wherein $R^1$ and $R^2$ represent independently a hydrocarbon group having 1 to 6 carbon atoms which can contain a nitrogen atom, an oxygen atom, or a silicon atom, and $R^1$ and $R^2$ can be combined to form a ring structure.

$R^1$ and $R^2$ can include methyl group, ethyl group, n-propyl group, isopropyl group n-butyl group, sec-butyl group, tert-butyl group, n-pentyl group, neopentyl-group, isopentyl group, n-hexyl group, cyclohexyl group, phenyl group, trimethylsilyl group, t-butyl-dimethylsilyl group and the like.

$R^1$ and $R^2$ can be combined. Group produced by combining $R^1$ and $R^2$ includes alkylene groups such as a trimethylene group, tetramethylene group, pentamethylene group, hexamethylene group and the like; oxyalkylene groups such as oxydiethylene group, oxydipropylene group and the like; and nitrogen-containing groups such as —$CH_2CH_2$—NH—$CH_2$—, —$CH_2CH_2$—N=CH—, and the like.

$R^1$ and $R^2$ are preferably hydrocarbon group having carbon atom of one to four which can have nitrogen atom, oxygen atom, or silicon atom, more preferably are methyl group, ethyl group, n-propyl group, trimethylsilyl group, —$CH_2CH_2$—NH—$CH_2$—, —$CH_2CH_2$—N=CH—, and the like, further more preferably methyl group, ethyl group, and n-propyl group, particularly preferably ethyl group.

The group expressed by the formula (II) can include non-cyclic amino group, and cyclic amino group. Exemplary non-cyclic amino group can include dimethylamino group, diethylamino group, di-(n-propyl)amino group, di-(isopropyl)amino group, di-(n-butyl)amino group, di-(sec-butyl) amino group, di-(tert-butyl)amino group, di-(neopentyl) amino group, ethylmethylamino group, di(methoxymethyl) amino group, di(methoxyethyl)amino group, di(ethoxymethyl)amino group, di(ethoxyethyl)amino group, di(t-butyldimethylsilyl)amino group, di(trimethylsilyl) amino group, and the like. The cyclic amino group can include 1-polymethyleneimino groups such as 1-pyrrolidinyl group, piperidino group, 1-hexamethyleneimino group, 1-heptamethyleneimino group, 1-octamethyleneimino group, 1-decamethyleneimino group, 1-dodecamethyleneimino group, 1-tetradecamethyleneimino group, and 1-octadecamethyleneimino group and the like. The cyclic amino group can also include 1-imidazolyl group, 4,5-dihydro-1-imidazolyl group, 1-imidazolidinyl group, 1-piperazinyl group, morpholino group and the like.

The group expressed by the formula (II) is preferably non-cyclic amino group, more preferably a dimethylamino group, a diethylamino group and a di(n-propyl)amino group in view of economics and easy availability, further more preferably a diethylamino group in view of enhancing a reduction in fuel consumption and grip properties.

The hydrocarbon group $X^1$ to $X^3$ of the formula (I) can include methyl group, ethyl group, n-propyl group, isopropyl group, n-butyl group, sec-butyl group, tert-butyl group, and the like. Preferably, the hydrocarbon group is a hydrocarbon group having carbon atom of one to four, more preferably methyl group and ethyl group.

At least one of $X^1$, $X^2$ and $X^3$ of the formula (I) is the group expressed by the formula (II), or a hydroxide group. Preferably, two or more of $X^1$, $X^2$ and $X^3$ are the group expressed by the formula (II), or a hydroxide group, and more preferably, two of $X^1$, $X^2$ and $X^3$ are the group expressed by the formula (II), or a hydroxide group.

Exemplary constitutional units expressed by the formula (I) are a silicon compound-based constitutional unit expressed by the following formula (III), preferably a bis(dimethylamino)methylvinylsilane-based constitutional unit, a bis(diethylamino) methylvinylsilane-based constitutional unit, and a bis(n-propylamino)methylvinylsilane-based constitutional unit from the point of view of a greater reduction in fuel consumption. Among others, in view of compatibility of good grip properties and availability and long-term storage stability of the compounds as well as lower fuel consumption, bis(diethylamino)methylvinylsilane-based constitutional unit is preferred.

The conjugated diene-based polymer of the present invention has a constitutional unit expressed by the formula (I) between one of the conjugated diene-based constitutional unit and another of the conjugated diene-based constitutional unit. The polymer chain contains preferably three or more of the constitutional units expressed by the formula (I). And the conjugated diene-based polymer has preferably three or more of a chain structure comprising one or more of the constitutional unit expressed by the formula (I) (a single chain or a single constitutional chain) in the polymer chain, said chain structure being between the conjugated diene-based constitutional units. The polymer chain has generally 10 or less of said chain structures.

The conjugated diene-based polymer of the present invention can contain a constitutional unit based on other monomer in addition to the conjugated diene-based constitutional unit (a conjugated diene-based unit) and the constitutional unit expressed by the formula (I). The other monomer includes aromatic vinyl, vinylnitrile, unsaturated carboxylate ester, and the like. Exemplary aromatic vinyl can include styrene, α-methylstyrene, vinyltoluene, vinylnaphthalene, divinylbenzene, trivinylbenzene, and divinylnaphthalene. Exemplary vinylnitrile can include acrylonitrile and the like. Exemplary unsaturated carboxylate ester can include methyl acrylate, ethyl acrylate, methyl methacrylate, ethyl methacrylate, and the like. Among them, styrene is preferred in view of easy availability.

The conjugated diene-based polymer of the present invention contains preferably an aromatic vinyl-based constitutional unit (an aromatic vinyl unit) from the point of view of increasing strength. The content of the aromatic vinyl unit is preferably not less than 10% by weight (the content of the conjugated diene unit is not higher than 90% by weight), more preferably not less than 15% by weight (the content of the conjugated diene unit is not higher than 85% by weight) based on the total of the conjugated diene unit and the aromatic vinyl unit of 100% by weight. Moreover, from the point of view of lowering fuel consumption, the content of the aromatic vinyl unit is preferably 50% by weight or less (the content of the conjugated diene unit is 50% by weight or more), more preferably 45% by weight or less (the content of the conjugated diene unit is 55% by weight or more).

The conjugated diene-based polymer of the present invention has a Mooney viscosity ($ML_{1+4}$) of preferably not less than 10, more preferably not less than 20 from the standpoint of increasing strength. Moreover, from the point of view of enhancing processability, it is preferably 200 or less, more preferably 150 or less. The Mooney viscosity ($ML_{1+4}$) is measured at 100° C. according to JIS K6300 (1994).

The amount of vinyl bonds in the conjugated diene-based polymer of the present invention is preferably not higher than 80 mol %, more preferably not higher than 70 mol % based on the total content of the conjugated diene units from the standpoint of lowering fuel consumption. Moreover, from the point of view of enhancing tire's grip performance, it is preferably 10 mol % or higher, more preferably 15 mol % or higher. The amount of the vinyl bonds can be obtained from an absorbance at the absorption peak of a vinyl group at around 910 $cm^{-1}$ according to Infrared Absorption Spectrophtometry.

Molecular weight distribution of the conjugated diene-based polymer of the present invention is preferably from 1 to 5, more preferably from 1 to 2 from the standpoint of lowering fuel consumption. Molecular weight distribution is obtained by measuring number-average molecular weight (Mn) and weight-average molecular weight (Mw) by gel permeation chromatography (GPC) method and by diving Mw by Mn.

A process for producing a conjugated diene-based polymer according to the present invention comprises the following steps (A), (B) and (C):

step (A): polymerizing a monomer containing a conjugated diene with an alkali metal catalyst in a hydrocarbon solvent to provide a conjugated diene-based polymer having an alkali metal derived from said catalyst at the end of a polymer chain;

step (B): adding a silicon compound expressed by the following formula (III) to a solution of said conjugated diene-based polymer having an alkali metal derived from said catalyst at the end of the polymer chain in a hydrocarbon solvent, so as to react said silicon compound at the end of the polymer chain to produce a conjugated diene-based polymer having a structure, in which the alkali metal derived from said alkali metal catalyst bonds to a constitutional unit based on the silicon compound expressed by the formula (III), at the end of the polymer chain;

(III)

(wherein $X^4$, $X^5$ and $X^6$ represent independently a group expressed by the following formula (II) or a hydrocarbon group, and at least one of $X^4$, $X^5$ and $X^6$ is the group expressed by the formula (II) or a hydroxide group:

(II)

wherein $R^1$ and $R^2$ represent independently a hydrocarbon group having 1 to 6 carbon atoms which can contain a nitrogen atom, an oxygen atom, or a silicon atom, and $R^1$ and $R^2$ can be combined to form a ring structure);

step (C): adding a monomer containing a conjugated diene to a solution of said conjugated diene-based polymer having a structure, in which the alkali metal derived from said alkali metal catalyst bonds to said constitutional unit based on the above formula (I), at the end of the polymer chain in a hydrocarbon solvent, so as to polymerize said monomer at the end of said polymer chain.

The alkali metal catalyst used in step (A) can include alkali metal, organic alkali metal compound, a complex of alkali metal and polar compound, oligomer containing alkali metal, and the like. The alkali metal in the catalyst can include lithium, sodium, potassium, rubidium, and cesium. The organic alkali metal compound can include ethyl lithium, n-propyl lithium, iso-propyl lithium, n-butyl lithium, sec-butyl lithium, t-octyl lithium, n-decyl lithium, phenyl lithium, 2-naphthyl lithium, 2-butyl-phenyl lithium, 4-phenyl-butyl lithium, cyclohexyl lithium, 4-cyclopentyl lithium, dimethylaminopropyl lithium, diethylaminopropyl lithium, t-butyldimethylsilyloxypropyl lithium, N-morphorinopropyl lithium, lithium hexamethyleneimide, lithium pyrrolidide, lithium piperidide, lithium heptamethyleneimide, lithium dodecamethyleneimide, 1,4-dilithio-butene-2, sodium naphthalene, sodium biphenyl, potassium naphthalene, and the like. The complex of alkali metal and polar compound can include potassium-tetrahydrofuran complex, potassium-diethoxyethane complex, and the like. The oligomer containing alkali metal can include sodium salt of α-methylstyrene tetramer. Among them, organic lithium compound or organic sodium compound are preferred, more preferably those having 2 to 20 carbon atoms are used.

The hydrocarbon solvent used in step (A) is a solvent which does not deactivate the alkali metal catalyst, and can include aliphatic hydrocarbon, aromatic hydrocarbon and alicyclic hydrocarbon. The aliphatic hydrocarbon can include propane, n-butane, iso-butane, n-pentane, iso-pentane, n-hexane, propene, 1-butene, iso-butene, trans-2-butene, cis-2-butene, 1-pentene, 2-pentene, 1-hexene, 2-hexene, and the like. The aromatic hydrocarbon can include benzene, toluene, xylene, and ethyl benzene. The alicyclic hydrocarbon can include cyclopentane, cyclohexane, and the like. These can be used alone or in a combination of two or more. Among them, hydrocarbon having 2 to 12 carbon atoms is preferred.

In step (A), the monomer containing a conjugated diene is polymerized to provide a conjugated diene-based polymer having an alkali metal derived from the alkali metal catalyst at the end of the polymer chain. The conjugated dienes may include 1,3-butadiene, isoprene, 1,3-pentadiene, 2,3-dimethyl-1,3-butadiene, and 1,3-hexadiene. These may be used alone or in combination of two or more of them. Among them, 1,3-butadiene and isoprene are preferred from the point of view of easy availability.

In step (A), polymerization may be performed with a conjugated diene alone or with a combination of a conjugated diene and other monomer. The other monomer may include aromatic vinyls, vinylnitriles, unsaturated carboxylate esters, and the like.

Exemplary aromatic vinyls may include styrene, α-methylstyrene, vinyltoluene, vinylnaphthalene, divinylbenzene, trivinylbenzene, and divinylnaphthalene. Moreover, exemplary vinylnitriles may include acrylonitrile and the like. Exemplary unsaturated carboxylate esters may include methyl acrylate, ethyl acrylate, methyl methacrylate, ethyl methacrylate, and the like. Among them, styrene is preferred in view of easy availability.

The polymerization in step (A), may be performed in the presence of an agent controlling the amount of vinyl bonds of conjugated diene units, and/or an agent of controlling the distribution of the conjugated diene units and the constitutional units based on monomers other than the conjugated dienes in the conjugated diene-based polymer chain (these agents are collectively referred to as "a controlling agent" hereafter). The controlling agent may include ether compounds, tertiary amines, phosphine compounds, and the like. The ether compounds may include cyclic ethers such as tetrahydrofuran, tetrahydropyran, 1,4-dioxane and the like; aliphatic monoethers such as diethylether, dibutylether and the like; aliphatic diethers such as ethylene glycol dimethylether, ethylene glycol diethylether, ethylene glycol dibutylether, diethylene glycol diethylether, diethylene glycol dibutylether; aromatic ethers such as diphenylether, anisole, and the like. The tertiary amines may include triethylamine, tripropylamine, tributylamine, N,N,N',N'-tetramethylethylenediamine, N,N-diethylaniline, pyridine, quinoline, and the like. Moreover, the phosphine compounds may include trimethylphosphine, triethylphosphine, triphenylphosphine, and the like. These may be used alone or in combination of two or more.

In step (A), the polymerization temperature is ordinarily 30 to 100° C., preferably 35 to 65° C. The polymerization period of time is ordinarily 10 minutes to 5 hours.

With respect to the silicon compound expressed by the formula (III) to be used in step (B), $X^4$, $X^5$ and $X^6$ represent independently a group expressed by the formula (II) or a hydrocarbon group, and at least one of $X^4$, $X^5$ and $X^6$ is a group expressed by the formula (II).

In the silicon compound expressed by the formula (III), exemplary $R^1$ and $R^2$ and preferred groups of the formula (II), exemplary groups and preferred groups of the formula (II) are the same as those illustrated above with regard to exemplary $R^1$ and $R^2$ and preferred groups of the formula (II), exemplary groups and preferred groups of the formula (II) in the aforementioned formula (I).

The $X^4$ to $X^6$ hydrocarbon groups of the formula (III) may include methyl group, ethyl group, n-propyl group, isopropyl group, n-butyl group, sec-butyl group, tert-butyl group, and the like. Preferably, the hydrocarbon groups are methyl group and ethyl group.

The silicon compounds expressed by the formula (III) where one of $X^4$ to $X^6$ is a non-cyclic amino group expressed by the formula (II) and other two are hydrocarbon groups may include:

(dimethylamino)dimethylvinylsilane, (ethylmethylamino)dimethylvinylsilane, (diethylamino)dimethylvinylsilane, (ethyl-n-propylamino)dimethylvinylsilane, (ethylisopropylamino)dimethylvinylsilane, (di-n-propylamino) dimethylvinylsilane, (diisopropylamino)dimethylvinylsilane, (n-butyl-n-propylamino)dimethylvinylsilane, (di-n-butylamino) dimethylvinylsilane, (dimethylamino)diethylvinylsilane, (ethylmethylamino)diethylvinylsilane, (diethylamino)diethylvinylsilane, (ethyl-n-propylamino)diethylvinylsilane, (ethylisopropylamino)diethylvinylsilane, (di-n-propylamino) diethylvinylsilane, (diisopropylamino)diethylvinylsilane, (n-butyl-n-propylamino) diethylvinylsilane, (di-n-butylamino)diethylvinylsilane, (dimethylamino)dipropylvinylsilane, (ethylmethylamino)dipropylvinylsilane, (diethylamino)dipropylvinylsilane, (ethyl-n-propylamino)dipropylvinylsilane, (ethylisopropylamino)dipropylvinylsilane, (di-n-propylamino) dipropylvinylsilane, (diisopropylamino)dipropylvinylsilane, (n-butyl-n-propylamino)dipropylvinylsilane, (di-n-butylamino) dipropylvinylsilane, (dimethylamino)dibutylvinylsilane, (ethylmethylamino)dibutylvinylsilane, (diethylamino)dibutylvinylsilane, (ethyl-n-propylamino)dibutylvinylsilane, (ethylisopropylamino)dibutylvinylsilane, (di-n-propylamino) dibutylvinylsilane, (diisopropylamino)dibutylvinylsilane, (n-butyl-n-propylamino)dibutylvinylsilane, (di-n-butylamino)dibutylvinylsilane,

[di(trimethylsilyl)amino]dimethylvinylsilane, di[(t-butyldimethylsilyl)amino]dimethylvinylsilane, [di(trimethylsilyl)amino]diethylvinylsilane, di[(t-butyl-dimethylsilyl)amino]diethylvinylsilane, and the like.

The silicon compounds where two of $X^4$ to $X^6$ are a non-cyclic amino group expressed by the formula (II) and another one is a hydrocarbon group may include:

bis(dimethylamino)methylvinylsilane, bis(ethylmethylamino)methylvinylsilane, bis(diethylamino)methylvinylsilane, bis(ethyl-n-propylamino)methylvinylsilane, bis(ethylisopropylamino)methylvinylsilane, bis(di-n-propylamino) methylvinylsilane, bis(di-isopropylamino)methylvinylsilane, bis(n-butyl-n-propylamino)methylvinylsilane, bis(di-n-butylamino)methylvinylsilane, bis(dimethylamino)ethylvinylsilane, bis(ethylmethylamino)ethylvinylsilane, bis(diethylamino)ethylvinylsilane, bis(ethyl-n-propylamino)ethylvinylsilane, bis(ethylisopropylamino)ethylvinylsilane, bis(di-n-propylamino) ethylvinylsilane, bis(diisopropylamino)ethylvinylsilane, bis(n-butyl-n-propylamino)ethylvinylsilane, bis(di-n-butylamino) ethylvinylsilane, bis(dimethylamino)propylvinylsilane, bis(ethylmethylamino)propylvinylsilane, bis(diethylamino)propylvinylsilane, bis(ethyl-n-propylamino)propylvinylsilane, bis(ethylisopropylamino)propylvinylsilane, bis(di-n-propylamino) propylvinylsilane, bis(diisopropylamino)propylvinylsilane, bis(n-butyl-n-propylamino)propylvinylsilane, bis(di-n-butylamino)propylvinylsilane, bis(dimethylamino)butylvinylsilane, bis(ethylmethylamino)butylvinylsilane, bis(diethylamino)butylvinylsilane, bis(ethyl-n-propylamino)butylvinylsilane, bis(ethylisopropylamino)butylvinylsilane, bis(di-n-propylamino) butylvinylsilane, bis(diisopropylamino)butylvinylsilane, bis(n-butyl-n-propylamino)butylvinylsilane, bis(di-n-butylamino) butylvinylsilane, bis[di(trimethylsilyl)amino]methylvinylsilane, bis[(t-butyldimethylsilyl)amino]methylvinylsilane, bis[di(trimethylsilyl)amino]ethylvinylsilane, bis[(t-butyl-dimethylsilyl) amino]ethylvinylsilane, and the like.

The silicon compounds where three of $X^4$ to $X^6$ are a non-cyclic amino group expressed by the formula (II) may include tri(dimethylamino)vinylsilane, tri(ethylmethylamino) vinylsilane, tri(diethylamino)vinylsilane, tri(ethylpropyl-amino)vinylsilane, tri(dipropylamino)vinylsilane, tri (butylpropylamino)vinylsilane, and the like.

The silicon compounds expressed by the formula (III) where at least one of $X^1$ to $X^3$ are a cyclic amino group expressed by the formula (II) may include bis(molphorino) methylvinylsilane, bis(piperidino)methylvinylsilane, bis(4, 5-dihydroimidazolyl)methylvinylsilane, bis(hexamethyleneimino)methylvinylsilane, and the like.

At least one of $X^4$, $X^5$ and $X^6$ of the formula (III) is a group expressed by the formula (II). Preferably, two or more of $X^4$, $X^5$ and $X^6$ are a group expressed by the formula (II) and more preferably, two of $X^4$, $X^5$ and $X^6$ are a group expressed by the formula (II).

In the silicon compounds expressed by the formula (III) where two of $X^4$, $X^5$ and $X^6$ are a group expressed by the formula (II), preferably, two of $X^4$, $X^5$ and $X^6$ are a non-cyclic amino group, more preferably, bis(dimethylamino) methylvinylsilane, bis(diethylamino)methylvinylsilane, and bis[di(n-propyl)amino]methylvinylsilane from the standpoint of lowering fuel consumption. Among others, bis(diethylamino) methylvinylsilane is preferred from the point of view of compatibility of good grip properties and further availability and long term storage stability of the compounds as well as lower fuel consumption.

In the step (B), addition of the silicon compound expressed by the formula (III) is usually conducted rapidly with stirring in a hydrocarbon solution.

The amount of the silicon compound expressed by the formula (III) to be added is preferably not less than 0.5 mol based on one mol of alkali metal derived from the alkali metal catalyst, more preferably not less than 0.7 mol from the point of view of lowering fuel consumption. Moreover, from the standpoint of enhancing economics in production, it is preferably 1.5 mol or less, more preferably 1.2 mol or less based on one step (B).

The silicon compound expressed by the formula (III) may be added to a solution of hydrocarbon in the form of a solution where the compounds are dissolved in a solvent which does not deactivate the alkali metal catalysts such as tetrahydrofuran, hexane and the like.

The concentration of the conjugated diene-based polymer in a hydrocarbon solution before the silicon compound expressed by the formula (III) is added is preferably not higher than 30% by weight, more preferably not higher than 20% by weight from the point of view of proceeding rapidly the reaction with the silicon compound. Moreover, form the standpoint of greater productivity, it is preferably 5% by weight or higher, more preferably 10% by weight or higher.

The stirring velocity of the hydrocarbon solution of the silicon compound expressed by the formula (III) to be added is preferably not less than 30 rpm, more preferably not less than 50 rpm, still more preferably not less than 70 rpm from the point of view of lowering fuel consumption and proceeding rapidly the reaction with the silicon compound. Moreover, form the standpoint of enhancing economics, it is preferably not higher than 400 rpm, more preferably not higher than 200 rpm, and still more preferably not higher than 200 rpm. The hydrocarbon solution of the silicon compound is usually added at a temperature of 35 to 65° C.

After the silicon compound expressed by the formula (III) is added, the hydrocarbon solution thereof should preferably be left to stand with stirring. The stirring velocity is usually 100 rpm or more, the temperature is usually 35° C. or higher, and the period of time is usually one second to 30 minutes.

In the step (C), to the hydrocarbon solution of the conjugated diene-based polymer produced in the step (B) and having a structure, in which the alkali metal derived from the alkali metal catalyst bonds to the constitutional unit based on the formula (I), at the end of the polymer chain, monomers including conjugated dienes are added so as to polymerize said monomers at the end of the polymer chain. The conjugated diene may include 1,3-butadiene, isoprene, 1,3-pentadiene, 2,3-dimethyl-1,3-butadiene, and 1,3-hexadiene. These may be used alone or in a combination of two or more. Among them, 1,3-butadiene and isoprene are preferred in view of easy availability.

In the step (C), the conjugated dienes may be polymerized alone or in a combination with other monomers. The other monomers may include aromatic vinyls, vinylnitriles, unsaturated carboxylate esters, and the like. Exemplary aromatic vinyls may include styrene, α-methylstyrene, vinyltoluene, vinylnaphthalene, divinylbenzene, trivinylbenzene, and divinylnaphthalene. Moreover, Exemplary vinylnitriles may include acrylonitrile and the like. Exemplary unsaturated carboxylate esters may include methyl acrylate, ethyl acrylate, methyl methacrylate, ethyl methacrylate, and the like. Among them, styrene is preferred in view of easy availability.

In step (C), the polymerization temperature is ordinarily 30 to 100° C., preferably 35 to 65° C. The polymerization period of time is ordinarily 10 minutes to 5 hours.

In the production of the conjugated diene-based polymer, there may be provided a plurality of steps (B) or steps (C).

In the course from the beginning of the polymerization to the termination thereof in the process for production according to the present invention, to the solution of the conjugated diene-based polymer in a hydrocarbon solvent, may be added a coupling agent expressed by the following formula:

$$R^7{}_a ML_{4-a} \quad (IV)$$

where $R^7$ represents alkyl group, alkenyl group, cycloalkenyl group, or aromatic hydrocarbon group, M represents silicon atom, or tin atom, L represents halide atom, and "a" represents an integer of 0 to 2.

The coupling agent expressed by the formula (IV) may include silicon tetrachloride, methyltrichlorosilane, dimethyldichlorosilane, trimethylchlorosilane, tin tetrachloride, tin methyltrichloride, tin dimethyldichloride, tin trimethylchloride, and the like.

The amount of the coupling agents to be added is preferably not less than 0.03 mol, more preferably not less than 0.05 mol based on one mol of the alkali metal derived from the alkali metal catalyst from the point of view of an increase in processability by kneading the conjugated diene-based polymer. Moreover, from the standpoint of lowering fuel consumption, it is preferably 0.4 mol or less, more preferably 0.3 mol or less.

The conjugated diene-based polymer can be recovered from the solution thereof in a hydrocarbon solvent by any one of well known methods, for example, (1) a method of adding a coagulant to the solution of the conjugated diene-based polymer in a hydrocarbon solvent, or (2) a method of adding steam to the conjugated diene-based polymer in a hydrocarbon solvent. The recovered conjugated diene-based polymer may be dried with a known drier such as a band drier or an extrusion drier.

Moreover, in a process for producing a conjugated diene-based polymer of the present invention, a process of substituting a group expressed by the formula (II) for a hydroxide group in the polymer may be conducted by hydrolysis or the like. The process of substitution may by performed in the state of the polymer alone, or of a composition as described later.

The conjugated diene-based polymer of the present invention can be used in the form of a conjugated diene-based composition by incorporating other polymer components, additives and the like.

The other polymer components may include conventional styrene-butadiene copolymer rubbers, polybutadiene rubbers, butadiene-isoprene copolymer rubbers, butyl rubbers and the like. Moreover, natural rubbers, ethylene-isopropylene copolymers, ethylene-octene copolymers may be raised. Those polymer components may be used in a combination of two or more.

When the other polymer components are incorporated into the conjugated diene-based polymer of the present invention, the content of the conjugated diene-based polymer of the present invention should preferably be not less than 10 parts by weight, more preferably not less than 20 parts by weight based on 100 parts by weight of the total of the polymer components (including the amount of the conjugated diene-based polymer) from the point of view of lowering fuel consumption.

As additives, well known additives can be used. Exemplary additives may include vulcanizers such as sulfur and the like: vulcanization promoters such as thiazole vulcanization promoters, thiuram vulcanization promoters, sulfenamide vulcanization promoters and the like; vulcanization activators such as stearic acid, zinc oxide and the like; organic peroxides; fillers such as silica, carbon black, calcium carbonate, talc, alumina, clay, aluminum hydroxide, mica and the like; silane coupling agents; extender oils; processing adjuvants; aging inhibitors; sliding agents.

When a filler is incorporated into the conjugated diene-based polymer of the present invention to produce a conjugated diene-based polymer composition, the amount of fillers to be incorporated is usually 10 to 150 parts by weight based on 100 parts by weight of the amount of the conjugated diene-based polymer of the present invention to be used. Moreover, it is preferably not less than 20 parts by weight, more preferably not less than 30 parts by weight from the point of view of lowering fuel consumption. Furthermore, it is preferably not higher than 120 parts by weight, more preferably not higher than 100 parts by weight from the standpoint of enhancing reinforcement properties.

When a conjugated diene-based polymer composition produced by incorporating a filler into the conjugated diene-based polymer of the present invention is used, from the point of view of lowering fuel consumption, the use of silica as filler is preferred. The amount of silica to be used should preferably be not less than 50 parts by weight, more preferably not less than 70 parts by weight based on the total of fillers to be incorporated.

As a method for producing a conjugated diene-based polymer composition by incorporating other polymer components and additives into the conjugated diene-based polymer of the present invention, well known methods, for example, those with rollers and/or Bumbury's mixer can be used to mix and knead the components.

As regard the conditions of mixing and kneading, when additives other than vulcanizators and vulcanization promoters are incorporated, the temperature of mixing and kneading is ordinarily 50 to 200° C., preferably 80 to 190° C., the mixing and kneading period of time is ordinarily 30 seconds to 30 minutes, preferably one minute to 30 minutes. When vulcanizers and/or vulcanization promoters are incorporated, the temperature of mixing and kneading is ordinarily not higher than 100° C., preferably room temperature to 80° C. The compositions containing vulcanizers and/or vulcanization promoters are usually used after vulcanization processing such as press vulcanization and the like. The vulcanization temperature is usually 120 to 200° C., preferably 140 to 180° C.

The conjugated diene-based polymer and the conjugated diene-based polymer composition according to the present invention are excellent in low fuel consumption and are good in grip properties. Moreover, they are good in abrasion resistance and strength.

The conjugated diene-based polymer and the conjugated diene-based polymer composition according to the present invention can be used for tires, shoe soles, floor materials, anti-vibration materials, and the like, especially for tires with great suitability.

EXAMPLES

The present invention will be described with reference to Examples hereafter.

Measurements of physical properties were made by the following procedures:

1. Mooney Viscosity ($ML_{1+4}$)

Measured at 100° C. according to JIS K6300 (1994).

2. Content of Vinyl (in Units of mol %)

Evaluated from an absorbance at the absorption peak of a vinyl group at around 910 $cm^{-1}$ according to Infrared Absorption Spectrophotometry.

3. Content of Styrene Unit (in Units of % by Weight)

Evaluated from a refractive index according to JIS K6383 (1995).

4. Molecular Weight Distribution (Mw/Mn)

Weight-average molecular weight (Mw) and number-average molecular weight (Mn) were measured and Mw/Mn was obtained by gel permeation chromatography (GPC) method under the following conditions (1) to (8).
(1) Device: HLC-8020 available from Tosoh Corporation
(2) Separating column: GMH-XL (two columns in series) available from Tosoh Corporation
(3) Measuring temperature: 40° C.
(4) Carrier: tetrahydrofuran
(5) Flow rate: 0.6 mL/minute
(6) Injected dose: 5 µL
(7) Detector: differential refractometer
(8) Molecular weight standard: standard polystyrene 5. Fuel Consumption Evaluated from loss tangents at temperatures of 50° C. and 70° C. (tan δ(50° C.) and tan δ(70° C.)) under a condition of a strain of 1% and a frequency of 10 Hz with a viscoelasticity-measuring device (available from UESHIMA SEISAKUSHO CO., LTD.). The lower this value, the more excellent in a reduction in fuel consumption.

6. Grip Properties

Evaluated from a loss tangent at a temperature of 0° C. (tan δ(0° C.)) under a condition of a strain of 1% and a frequency of 10 Hz with a viscoelasticity-measuring device (available from UESHIMA SEISAKUSHO CO., LTD.). The larger this value, the more excellent in grip properties.

Example 1

After a 20 liter stainless polymerization reactor was washed, dried, and purged with dry nitrogen, 10.2 kg of hexane (a specific gravity of 0.68 g/cm$^3$), 547 g of 1,3-butadiene, 173 g of styrene, 6.1 mL of tetrahydrofuran, 5.0 mL of ethylene glycol diethylether were charged into the polymerization reactor. A solution of 14.5 mmol of n-butyl lithium in n-hexane was then charged, whereby polymerization was initiated to copolymerize 1,3-butadiene and styrene for one hour. During the polymerization, monomers were continuously supplied into the reactor controlled inside at a temperature of 65° C. with stirring at a velocity of 130 rpm.

After one hour of the polymerization, a solution of 11.0 mmol of bis(dimethylamino) methylvinylsilane which had been dried with molecular sieves (3 A) in 10 mL of cyclohexane (which solution is referred to as AS solution hereafter) was promptly charged into the reactor under the conditions of a stirring velocity of 130 rpm and a temperature within the reactor of 65° C.

After AS solution was charged, monomers were supplied to the polymerization reactor to copolymerize 1,3-butadiene and styrene for 0.5 hour. During the polymerization, the stirring velocity was 130 rpm and the polymerization temperature was 65° C.

After 0.5 hour of polymerization (1.5 hours after the polymerization was initiated), AS solution was promptly charged into the polymerization reactor under the conditions of a stirring velocity of 130 rpm and a temperature within the reactor of 65° C.

After the AS solution was charged, monomers were supplied to the polymerization reactor to copolymerize 1,3-butadiene and styrene for 0.5 hour. During the polymerization, the stirring velocity was 130 rpm and the polymerization temperature was 65° C.

After 0.5 hour of polymerization (2 hours after the polymerization was initiated), AS solution was promptly charged into the polymerization reactor under the conditions of a stirring velocity of 130 rpm and a temperature within the reactor of 65° C.

After the AS solution was charged, monomers were supplied to the polymerization reactor to copolymerize 1,3-butadiene and styrene for one hour. During the polymerization, the stirring velocity was 130 rpm and the polymerization temperature was 65° C.

After one hour of polymerization (3 hours after the polymerization was initiated), 20 mL of hexane containing 0.5 mL of methanol was charged and the polymer solution was agitated for 5 minutes. Consequently the total amount of 1,3-butadiene to be supplied for the total polymerization time of 3 hours was 821 g and that of styrene was 259 g.

To the polymer solution, 7.2 g of 2-tert-butyl-6-(3-tert-butyl-2-hydroxy-5-methylbenzyl)-4-methylphenylacrylate (available from Sumitomo Chemical Co. under the tradename of SUMILIZER GM) and 3.6 g of pentaerythrityl tetrakis(3-laurylpropionate) (available from Sumitomo Chemical Co. under the tradename of SUMILIZER TP-D) were added and then the polymer solution was evaporated at normal temperature for 24 hours and further dried under a reduced pressure for 12 hours at 55° C. to yield a polymer. The polymer was measured for Mooney viscosity, vinyl content, and styrene unit content, the results of which are summarized in Table 1.

100 parts by weight of the resulting polymer, 78.4 parts by weight of silica (available from De Gussa Co. under the tradename of ULTRASIL VN3-G), 6.4 parts by weight of silane coupling agent (available from De Gussa Co. under the tradename of Si69), 6.4 parts by weight of carbon, 47.6 parts by weight of extender oil (available from Kyodo Petroleum Co. under the tradename of X-140), 1.5 parts by weight of anti-aging agent (available from Sumitomo Chemical Co. under the tradename of ANTIGEN 3C), 2 parts by weight of stearic acid, 2 parts by weight of zinc white, one part by weight of vulcanization promoter (available from Sumitomo Chemical Co. under the tradename of SOKUSHINOL CZ), one part by weight of vulcanization promoter (available from Sumitomo Chemical Co. under the tradename of SOKUSHINOL D), 1.5 parts by weight of wax (available from Oouchi Shinko Chemical Industry Co. under the tradename of SUN KNOCK N), and 1.4 parts by weight of sulfur were kneaded with Labo-Plast Mill and the resulting mixture was rolled with 6 in. rollers in a sheet. The sheet was vulcanized by heating for 45 minutes at 160° C. The vulcanized sheet was evaluated for fuel consumption, the results of which are presented in Table 1.

Example 2

After a 20 liter stainless polymerization reactor was washed, dried, and purged with dry nitrogen, 10.2 kg of hexane (a specific gravity of 0.68 g/cm$^3$), 547 g of 1,3-butadiene, 173 g of styrene, 6.1 mL of tetrahydrofuran, 5.0 mL of ethylene glycol diethylether were charged into the polymerization reactor. A solution of 13.8 mmol of n-butyl lithium in n-hexane was then charged, whereby polymerization was initiated to copolymerize 1,3-butadiene and styrene for 0.5 hour. During the polymerization, monomers were continuously supplied into the reactor controlled inside at a temperature of 65° C. with stirring at a velocity of 130 rpm.

After 0.5 hour of the polymerization, AS solution was promptly charged into the polymerization reactor under the conditions of a stirring velocity of 130 rpm and a temperature within the reactor of 65° C.

After the AS solution was charged, monomers were supplied to the polymerization reactor to copolymerize 1,3-butadiene and styrene for 0.5 hour. During the polymerization, the stirring velocity was 130 rpm and the polymerization temperature was 65° C.

After 0.5 hour of polymerization (one hour after the polymerization was initiated), AS solution was promptly charged into the polymerization reactor under the conditions of a stirring velocity of 130 rpm and a temperature within the reactor of 65° C.

After the AS solution was charged, monomers were supplied to the polymerization reactor to copolymerize 1,3-butadiene and styrene for 0.5 hour. During the polymerization, the stirring velocity was 130 rpm and the polymerization temperature was 65° C.

After 0.5 hour of polymerization (1.5 hours after the polymerization was initiated), AS solution was promptly charged into the polymerization reactor under the conditions of a stirring velocity of 130 rpm and a temperature within the reactor of 65° C.

After the AS solution was charged, monomers were supplied to the polymerization reactor to copolymerize 1,3-butadiene and styrene for 0.5 hour. During the polymerization, the stirring velocity was 130 rpm and the polymerization temperature was 65° C.

After 0.5 hour of polymerization (2 hours after the polymerization was initiated), AS solution was promptly charged into the polymerization reactor under the conditions of a stirring velocity of 130 rpm and a temperature within the reactor of 65° C.

After the AS solution was charged, monomers were supplied to the polymerization reactor to copolymerize 1,3-butadiene and styrene for 0.25 hour. During the polymerization, the stirring velocity was 130 rpm and the polymerization temperature was 65° C.

After 0.25 hour of polymerization (2.25 hours after the polymerization was initiated), AS solution was promptly charged into the polymerization reactor under the conditions of a stirring velocity of 130 rpm and a temperature within the reactor of 65° C.

After the AS solution was charged, monomers were supplied to the polymerization reactor to copolymerize 1,3-butadiene and styrene for 0.75 hour. During the polymerization, the stirring velocity was 130 rpm and the polymerization temperature was 65° C.

After 0.75 hour of polymerization (3 hours after the polymerization was initiated), 20 mL of hexane containing 0.5 mL of methanol was charged and further the polymer solution was agitated for 5 minutes. Consequently the total amount of 1,3-butadiene to be supplied for the total polymerization time of 3 hours was 821 g and that of styrene was 259 g.

According to the same procedure as described in Example 1 the resulting polymer was removed from the polymer solution and processed into a vulcanized sheet. The vulcanized sheet was measured for Mooney viscosity, vinyl content, and styrene unit content, the results of which and those obtained by evaluating the fuel consumption of the sheet are presented in Table 1.

Example 3

After a 20 liter stainless polymerization reactor was washed, dried, and purged with dry nitrogen, 10.2 kg of hexane (a specific gravity of 0.68 g/cm$^3$), 547 g of 1,3-butadiene, 173 g of styrene, 6.1 mL of tetrahydrofuran, 5.0 mL of ethylene glycol diethylether were charged into the polymerization reactor. A solution of 13.6 mmol of n-butyl lithium in n-hexane was then charged, whereby polymerization was initiated to copolymerize 1,3-butadiene and styrene for 1 hour. During the polymerization, monomers were continuously supplied into the reactor controlled inside at a temperature of 65° C. with stirring at a velocity of 130 rpm.

After one hour of the polymerization, a solution of 11.0 mmol of bis(diethylamino) methylvinylsilane which had been dried with molecular sieves (3 A) in 13.3 mL of cyclohexane (which solution is referred to as AS2 solution hereafter) was promptly charged into the reactor under the conditions of a stirring velocity of 130 rpm and a temperature within the reactor of 65° C.

After AS2 solution was charged, monomers were supplied to the polymerization reactor to copolymerize 1,3-butadiene and styrene for 0.5 hour. During the polymerization, the stirring velocity was 130 rpm and the polymerization temperature was 65° C.

After 0.5 hour of polymerization (1.5 hours after the polymerization was initiated), AS2 solution was promptly charged into the polymerization reactor under the conditions of a stirring velocity of 130 rpm and a temperature within the reactor of 65° C.

After the AS2 solution was charged, monomers were supplied to the polymerization reactor to copolymerize 1,3-butadiene and styrene for 0.5 hour. During the polymerization, the stirring velocity was 130 rpm and the polymerization temperature was 65° C.

After 0.5 hour of polymerization (2 hours after the polymerization was initiated), AS2 solution was promptly charged into the polymerization reactor under the conditions of a stirring velocity of 130 rpm and a temperature within the reactor of 65° C.

After the AS2 solution was charged, monomers were supplied to the polymerization reactor to copolymerize 1,3-butadiene and styrene for one hour. During the polymerization, the stirring velocity was 130 rpm and the polymerization temperature was 65° C.

After one hour of polymerization (3 hours after the polymerization was initiated), 20 mL of hexane containing 0.5 mL of methanol was charged and the polymer solution was agitated for 5 minutes. Consequently the total amount of 1,3-butadiene to be supplied for the total polymerization time of 3 hours was 821 g and that of styrene was 259 g.

To the polymer solution, 7.2 g of 2-tert-butyl-6-(3-tert-butyl-2-hydroxy-5-methylbenzyl)-4-methylphenylacrylate (available from Sumitomo Chemical Co. under the tradename of SUMILIZER GM) and 3.6 g of pentaerythrityl tetrakis(3-laurylpropionate) (available from Sumitomo Chemical Co. under the tradename of SUMILIZER TP-D) were added and then the polymer solution was evaporated at normal temperature for 24 hours and further dried under a reduced pressure for 12 hours at 55° C. to yield a polymer. The polymer was measured for Mooney viscosity, vinyl content, and styrene unit content, the results of which are summarized in Table 1.

100 parts by weight of the resulting polymer, 78.4 parts by weight of silica (available from De Gussa Co. under the tradename of ULTRASIL VN3-G), 6.4 parts by weight of silane coupling agent (available from De Gussa Co. under the tradename of Si69), 6.4 parts by weight of carbon, 47.6 parts by weight of extender oil (available from Kyodo Petroleum Co. under the tradename of X-140), 1.5 parts by weight of anti-aging agent (available from Sumitomo Chemical Co. under the tradename of ANTIGEN 3C), 2 parts by weight of stearic acid, 2 parts by weight of zinc white, one part by weight of vulcanization promoter (available from Sumitomo Chemical Co. under the tradename of SOKUSHINOL CZ), one part by weight of vulcanization promoter (available from Sumitomo Chemical Co. under the tradename of SOKUSHINOL D), 1.5 parts by weight of wax (available from Oouchi Shinko Chemical Industry Co. under the tradename of SUN KNOCK N), and 1.4 parts by weight of sulfur were kneaded with Labo-Plast Mill and the resulting mixture was rolled with 6 in. rollers in a sheet. The sheet was vulcanized by heating for 45 minutes at 160° C. The vulcanized sheet was evaluated for fuel consumption, the results of which are presented in Table 1.

Comparative Example 1

After a 20 liter stainless polymerization reactor was washed, dried, and purged with dry nitrogen, 10.2 kg of hexane (a specific gravity of 0.68 g/cm³), 547 g of 1,3-butadiene, 173 g of styrene, 6.1 mL of tetrahydrofuran, 5.0 mL of ethylene glycol diethylether were charged into the polymerization reactor. A solution of 13.1 mmol of n-butyl lithium in n-hexane was then charged, the reactor was controlled inside at a temperature of 65° C., 1,3-butadiene and styrene were introduced into the polymerization reactor to effect polymerization with stirring at a velocity of 130 rpm for 3 hours to yield a polymer solution. During the polymerization for 3 hours, the total amount of 1,3-butadiene to be supplied was 821 g and that of styrene was 259 g.

To the resulting polymer solution, a solution obtained by dissolving 11.0 mmol of bis(dimethylamino)methylvinylsilane which had been dried with molecular sieves (3 A) in 10 mL of cyclohexane was added and stirred for 60 minutes. Then, 10 mL of methanol was charged and further the polymer solution was agitated for 5 minutes.

According to the same procedure as described in Example 1 the resulting polymer was removed from the polymer solution by and processed into a vulcanized sheet. The polymer and the vulcanized sheet was evaluated, the results of which are presented in Table 1.

TABLE 1

| | | Ex. 1 | Ex. 2 | Ex. 3 | Comp. Ex. 1 |
|---|---|---|---|---|---|
| Physical properties | | | | | |
| Mooney viscosity | | — | 53 | 52 | 40 | 56 |
| Vinyl content | % | 59 | 60 | 59 | 59 |
| Styrene unit content | wt % | 25 | 24 | 25 | 25 |
| Moledular weight distribution | | — | 1.25 | 1.29 | 1.10 | 1.34 |
| Fuel consumption | | | | | |
| tan δ(50° C.) | | — | 0.139 | 0.126 | — | 0.176 |
| tan δ(75° C.) | | — | 0.126 | 0.112 | 0.113 | 0.147 |
| Grip properties | | | | | |
| tan δ(° C.) | | — | 0.724 | 0.764 | 1.114 | 0.635 |

The invention claimed is:

1. A process for producing a conjugated diene-based polymer comprising the following steps (A), (B) and (C):

step (A): polymerizing a monomer containing a conjugated diene with an alkali metal catalyst in a hydrocarbon solvent to provide a conjugated diene-based polymer having an alkali metal derived from said catalyst at the end of a polymer chain;

step (B): adding a silicon compound expressed by the following formula (III) to a solution of said conjugated diene-based polymer having an alkali metal derived from said catalyst at the end of the polymer chain in a hydrocarbon solvent, so as to react said silicon compound at the end of the polymer chain to produce a conjugated diene-based polymer having a structure, in which the alkali metal derived from said alkali metal catalyst bonds to a constitutional unit based on the silicon compound expressed by the formula (III), at the end of the polymer chain;

(wherein $X^4$, $X^5$ and $X^6$ represent independently a group expressed by the following formula (II) or a hydrocarbon group, and at least one of $X^4$, $X^5$ and $X^6$ is the group expressed by the formula (II) or a hydroxide group:

wherein $R^1$ and $R^2$ represent independently a hydrocarbon group having 1 to 6 carbon atoms which can contain a nitrogen atom, an oxygen atom, or a silicon atom, and $R^1$ and $R^2$ can be combined to form a ring structure);

step (C): adding a monomer containing a conjugated diene to a solution of said conjugated diene-based polymer having a structure, in which the alkali metal derived from said alkali metal catalyst bonds to a constitutional unit based on a silicon compound expressed by the formula (I),

wherein $X^1$, $X^2$ and $X^3$ represent independently a group expressed by the formula (II), a hydroxide group, or a hydrocarbon group, and at least one of $X^1$, $X^2$ and $X^3$ is the group expressed by the formula (II) or a hydroxide group, at the end of the polymer chain in a hydrocarbon solvent, so as to polymerize said monomer at the end of said polymer chain.

2. The process according to claim 1, wherein $R^1$ and $R^2$ represent independently methyl group, ethyl group or n-propyl group.

3. The process according to claim 1, wherein two of $X^1$, $X^2$ and $X^3$ of the formula (I) are the group expressed by the formula (II), or a hydroxide group.

4. The process according to claim 1, wherein three or more of said constitutional units expressed by the formula (I) are contained in a polymer chain.

5. The process according to claim 1, which further comprises incorporating a filler to the conjugated diene-based polymer to obtain a conjugated diene-based polymer composition.

6. The process according to claim 5, wherein the amount of said filler to be incorporated is 10 to 150 parts by weight based on 100 parts by weight of the conjugated diene-based polymer to be incorporated.

* * * * *